Figure 4:
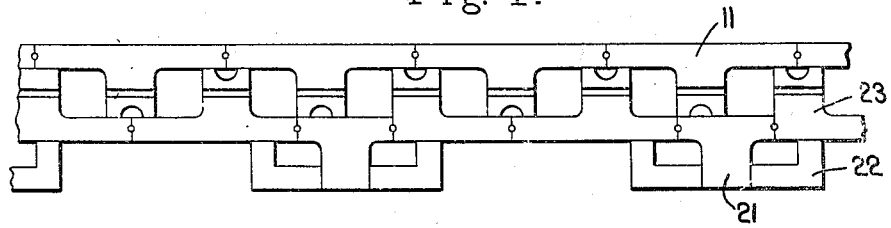

T. C. TYSON.
SYSTEM OF COMPOSITION UNIT CONSTRUCTION.
APPLICATION FILED FEB. 4, 1918.
1,355,580.
Patented Oct. 12, 1920.
4 SHEETS—SHEET 1.
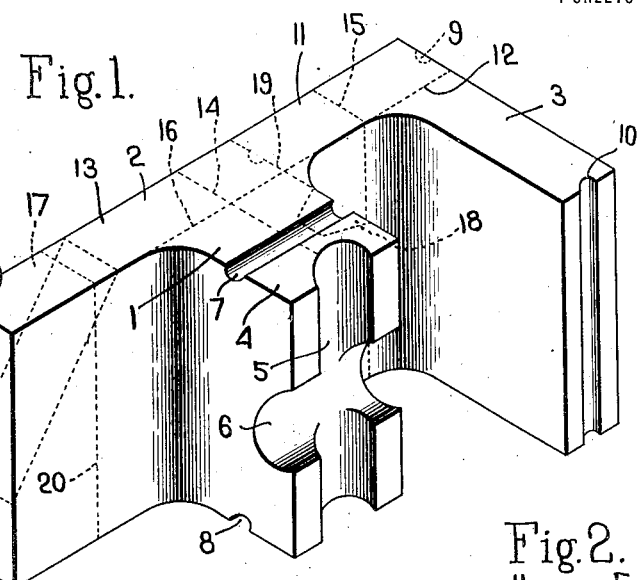
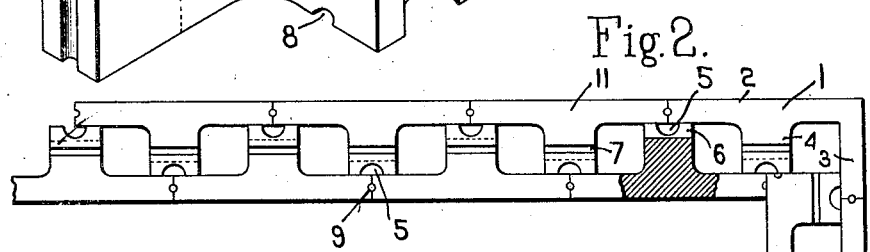
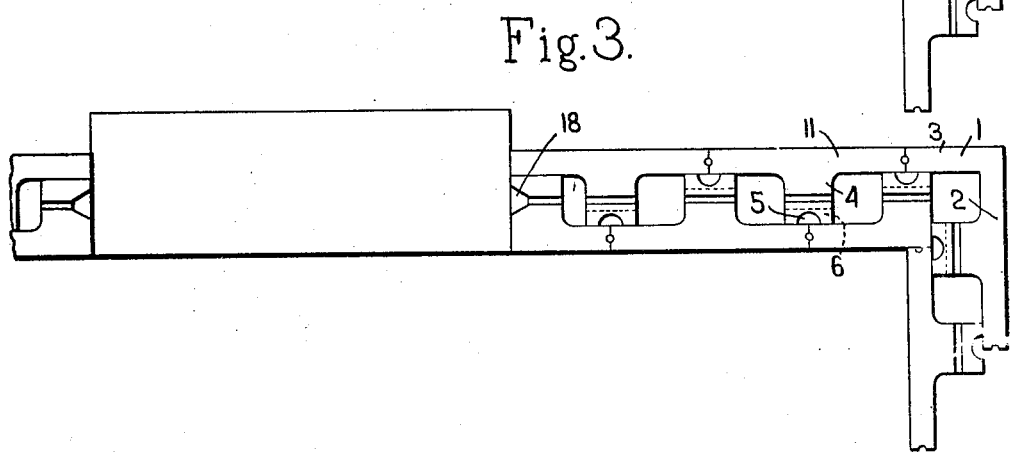
Inventor.
Thomas C. Tyson
by Heard Smith & Tennant.
Attys.

T. C. TYSON.
SYSTEM OF COMPOSITION UNIT CONSTRUCTION.
APPLICATION FILED FEB. 4, 1918.

Patented Oct. 12, 1920.

Inventor.
Thomas C. Tyson
by Heard Smith & Tennant
Attys.

T. C. TYSON.
SYSTEM OF COMPOSITION UNIT CONSTRUCTION.
APPLICATION FILED FEB. 4, 1918.

1,355,580.

Patented Oct. 12, 1920.
4 SHEETS—SHEET 4.

Inventor.
Thomas C. Tyson
by Heard Smith & Tennant
Attys.

UNITED STATES PATENT OFFICE.

THOMAS C. TYSON, OF WEST MEDFORD, MASSACHUSETTS.

SYSTEM OF COMPOSITION UNIT CONSTRUCTION.

1,355,580.

Specification of Letters Patent.    Patented Oct. 12, 1920.

Application filed February 4, 1918. Serial No. 215,242.

*To all whom it may concern:*

Be it known that I, THOMAS CALVIN TYSON, a subject of the King of Great Britain, and resident of West Medford, county of Middlesex, State of Massachusetts, have invented an Improvement in Systems of Composition Unit Construction, of which the following description, in connection with the accompanying drawing, is a specification, like characters on the drawing representing like parts.

This invention relates to improvements in composition block constructions and the principal object thereof is to produce a simple, practical and economic system of unit construction in which all of the elements required to form a structure of masonry such as a wall, a pier, emplacement, etc., may be composed of blocks in the form of a unit or of a fractional part of said unit and in which proper bonding and ventilation if desired may be provided.

Another object of the invention is to produce a principal or master unit adapted to be formed of plastic material by casting, molding or otherwise, said unit being of such a character that the various fractional parts required for any structure may be made in a single mold adapted to produce the unit, said fractional elements being produced by placing filler blocks in the mold and filling the portions thereof which are not necessary to form the desired elements.

Another object of the invention is to provide a unit of the character above described which will have a proper bonding means, both when used as a whole or in its various fractional parts.

A further object of the invention is to produced a unit which may be utilized as a whole or in fractional parts and which may be combined with standard building materials such as bricks and which will bond properly to form walls or structures of different thickness and different characters.

Another object of the invention is to provide a unit construction of the character described in which the unit block or fractional parts thereof may be utilized for purposes such as the building of pilasters and columns.

Another object of the invention is to provide a wall construction formed of units and elements comprising fractional portions of said units, said units and elements being so constructed as to provide a thorough system of ventilation for the wall structure.

Another object of the invention is to provide a wall structure in which the vertical and horizontal joints are so ventilated throughout as to prevent the passage of moisture through the wall, thereby providing a construction adapted to be plastered or coated with stucco and in which the plastering or stucco applied will not crack or peel as frequently happens in structures in which materials capable of shrinkage are used or in which the structure is such as to permit the passage of moisture through portions of the wall.

Figure 5:
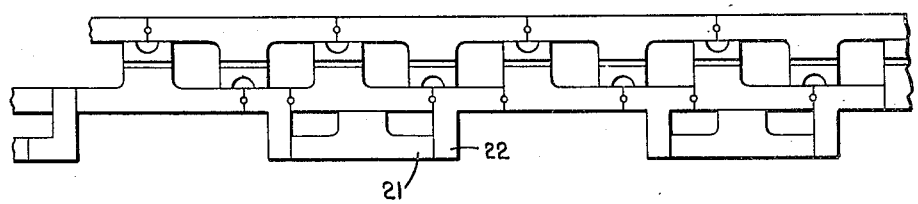
Figure 6:
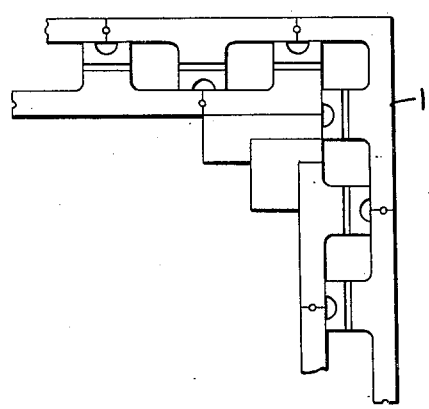
Figure 7:
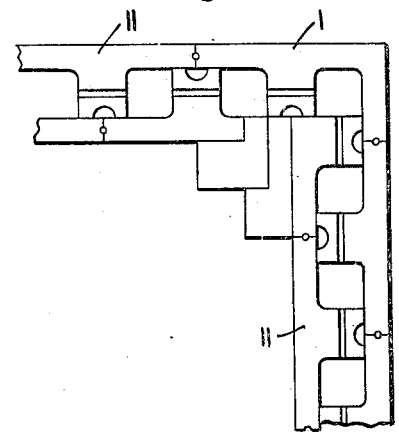
Figure 8:
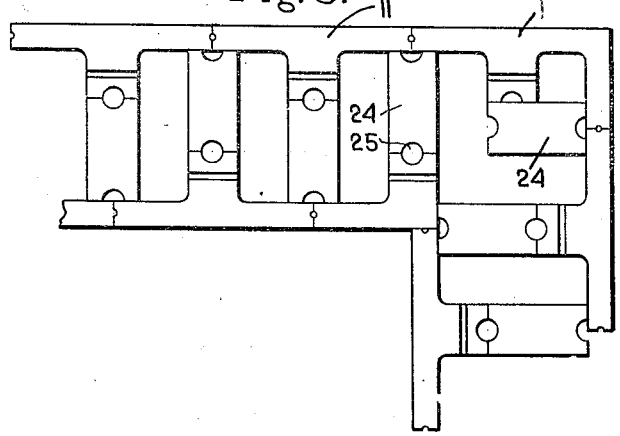
Figure 9:
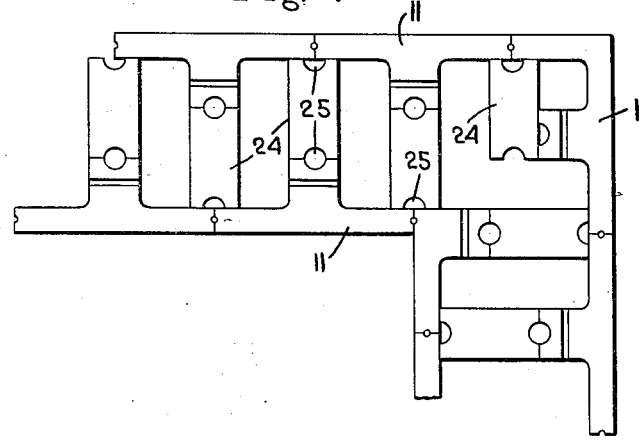
Figure 10:
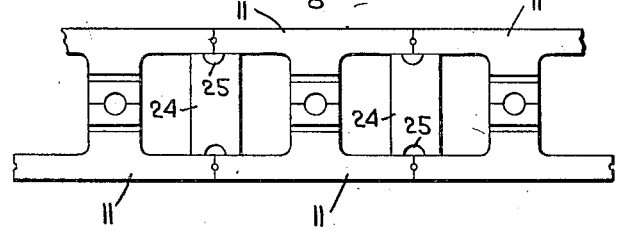

In the drawings;

Figure 1 is a perspective view of a unit block showing in dotted lines various devices which may be made thereof to form different fractional interchangeable elements capable of use in conjunction with one another in building construction, all of said fractional elements being capable of manufacture in the unit mold, Fig. 2 is a plan view of one course of the corner and side portion of a wall made in accordance with my improved system, Fig. 3 is a similar view of a course of construction adapted to alternate with the course illustrated in Fig. 2, and Fig. 3 showing also means for inserting a metallic window frame, Fig. 4 is a plan view of a wall construction employing fractional units used both in the wall construction and for pilasters, Fig. 5 is a similar view showing the course which alternates with that illustrated in Fig. 4, Fig. 6 is a plan view of one course of a corner having an interior corner pilaster, Fig. 7 is a similar view of the same showing the alternating course, Fig. 8 is a plan view of a corner illustrating a unit and fractional construction as in a wall construction of greater thickness in which commercial structural units such as bricks may be used, Fig. 9 is a similar view of the alternating courses used in combination with that illustrated in Fig. 8, Fig. 10 is a view of a section of wall of a thickness intermediate that illustrated in Figs. 2 to 7 and that illustrated in Figs. 8 and 9.

Figure 11:
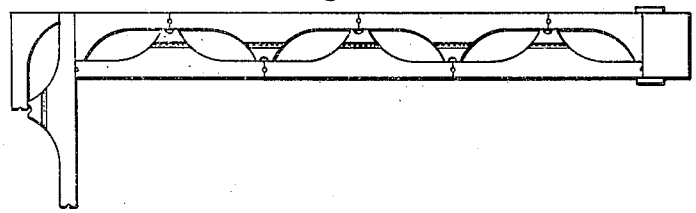
Figure 12:
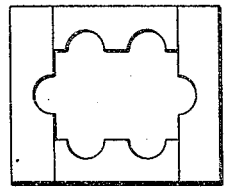
Figure 13:
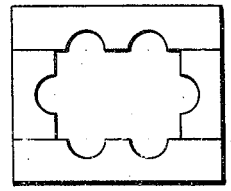
Figure 14:
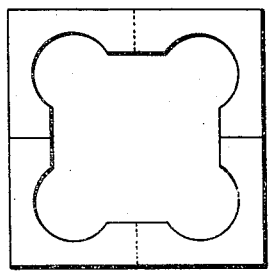
Figure 15:
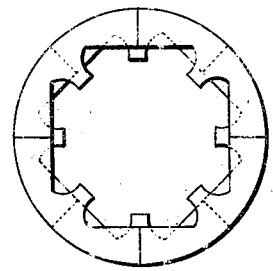
Figure 16:
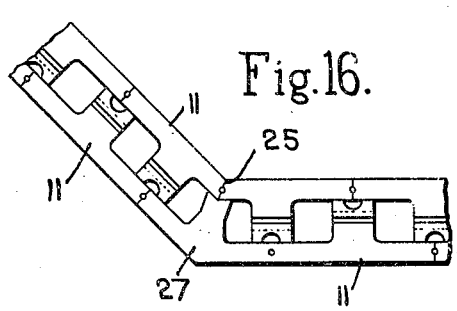
Figure 17:
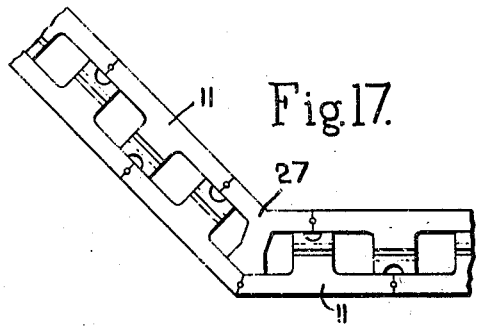

Fig. 11 is an illustration of one of the courses of a partition wall showing a modified form of unit and fractional block construction, Fig. 12 is a plan view of one course of a chimney structure, Fig. 13 is a plan view of the alternating course of chimney construction, Fig. 14 is a plan view of a square column construction, Fig. 15 is a plan view of a round column construction, Fig. 16 is a plan view of one of the courses of a bay window construction, and, Fig. 17 is a similar view of the alternate courses of bay window construction.

The unit and fractional structures shown in the accompanying drawings are illustrative of a few of the many uses to which this invention may be applied, the principal object of the invention being to produce a simple, economical and practical form of unit construction covering a wide range of interchangeable parts, all of which are a part of one principal unit, preferably of the type illustrated in Fig. 1. Any part or combination of parts of this principal unit may be employed as required by the design and building conditions of the structure being erected.

Among the special features of the system of unit construction are the simplicity of the units, the use of fractional parts of the units which may be produced in the same forms or molds by the use of filler blocks inserted in the forms or molds to fill the undesired portion of the mold at the time of casting or molding.

The unit blocks may be and preferably are so constructed as to present faces so that when the unit blocks and fractional parts are assembled to form a wall the wall will be properly faced upon the outside and inside. The surface forming the face may be plain or may be paneled, tooled, rock faced, colored or otherwise treated, or may be made rough and thus adapted to receive a stucco or plaster finish which will adhere with greater tenacity than in usual constructions because of the cementitious content of both the blocks and the plaster or stucco which is applied thereto.

In the present construction the cracking of the plaster or stucco which frequently occurs in usual structures due to lumber shrinkage, settling, checking and twisting of lath, etc., is entirely avoided.

The principal unit 1 which is illustrated in Fig. 1 of the accompanying drawings comprises two facing members 2 and 3, preferably extending at right angles to each other and a bonding member 4 which extends from the rear central portion of one of the facing members, the bonding member 4 preferably being twice the thickness of the facing members 2 and 3.

For convenience in description the dimensions will be given of a suitable unit adapted to form an eight inch wall or in combination with standard structural units to form a twelve or sixteen inch wall. It will however be understood that the dimensions herein given are illustrative merely and that unit blocks of other dimensions but preferably substantially the same proportions may be utilized in accordance with the construction which is being erected.

The principal facing member 2 of the unit block is sixteen inches in length, eight inches in width and two inches in thickness. The facing member 3 which likewise is two inches in thickness presents a face which is eight inches in length and eight inches in width. The bonding member which extends centrally from the rear of the facing member 2 is four inches in breadth and thickness and as it extends across the facing member 2 is consequently eight inches in length. The unit block, therefore, is of the shape of a letter F. The inner face of the bonding member preferably is provided with a vertical ventilating groove 5 and transverse ventilating groove 6 while the upper and lower sides of the bonding members are provided with preferably smaller grooves 7 and 8.

The ends of the facing members may likewise be provided with grooves 9 and 10, all grooves preferably being formed by filler blocks removably placed in a mold so that the unit member may if desired be made without the grooves. By placing suitable fillers in the mold any desired fractional block may be formed. For example, by placing a filler in the portion of the mold which forms the facing member 3 a T-shaped block 11 may be formed, the inner wall of which is defined by the dotted line 12.

By placing other filler blocks in the mold an L-shaped block 13 (see Fig. 1) may be formed, which will present a facing indicated by dotted lines 14. By using other fillers, various other fractional blocks may be formed, the walls of which are indicated by the dotted lines 15, 16, 17, 18, 19 and 20, the dotted line 17 illustrating a means by which a gable to receive a rafter may be provided and the dotted line 18 indicating a recess adapted to receive metal windows or other suitable frame used in the construction of houses or like buildings.

Figs. 2 to 10 illustrate various types of wall structure which may be conveniently made with the unit and fractional blocks above described. Figs. 2 and 3 illustrate a wall in which the corners are formed of the unit block 1 laid in different positions to produce a proper bonding while the main portion of the wall is constructed of the fractional blocks 11 above described. It will be noted that in this construction the grooves 9, 10 at the ends of the blocks 1 and 11 provide keyways which when filled with mortar or cement secure the adjacent blocks of the wall rigidly together. The vertical groove 5 embraces and incloses the vertical joint between the abutting ends of the blocks while the grooves 6 form passageways between the vertical air passages.

In the completed structure the horizontal grooves present a staggered arrangement so that if an opening is left at or near the bottom of one end of the wall and another opening at the diagonal upper corner of said wall a free circulation of air will be induced at all times which will evaporate any moisture which may percolate through the walls or seep through the vertical or horizontal joints.

In this connection it may be mentioned that the grooves 7 upon the top and bottom of the bonding member will register when the blocks are laid so as to provide additional transverse air passages, even though a portion of such groove should be filled with mortar in building the wall. These grooves 7, therefore provide an additional means for dissipating any moisture which may percolate or seep through the horizontal joints between the adjacent blocks.

Figs. 4 and 5 illustrate alternate courses of a different character of hollow wall in which certain fractional members of the principal unit block are utilized to form pilasters extending from the side of the wall. In this wall the principal blocks are of the form of the block 11 heretofore described while the pilasters are made of fractional blocks 21 bounded by the lines 15 and 20 of the main structures combined with L-shaped blocks 22 the face of which is indicated by the dotted line 14 in Fig. 1. Other fractional blocks 23 which are used in this structure present boundaries defined by the dotted line 19 in Fig. 1.

In Figs. 6 and 7 similar blocks are used in the formation of pilaster effects in the corner of the room, the main portion of the corners being constructed with blocks 1 as in Figs. 1 and 2, while the main portion of the wall is formed of fractional blocks 11. The pilasters in the corners are built of fractional blocks which may be formed in the mold for the principal unit by the insertion therein of filler blocks in a manner which will be obvious from inspection.

Figs. 8 and 9 illustrate alternate courses of a sixteen inch wall in which the principal unit 1 forms the corner wall, the fractional units 11 form the main portion of the wall, being bonded by standard structural blocks 24 which preferably are provided with grooves 25 at their ends to form air passages.

Any standard structural members such as bricks may be used for these bonding members. In Fig. 10 a similar wall construction adapted to form a twelve inch wall is employed, the difference being that the joints between the units 11 are placed opposite each other and the additional structural members are located opposite the joints. Various other thicknesses of wall may be made by using supplemental structural blocks, all of which blocks may be formed as fractions of the unit block by placing suitable fillers in the mold.

In Figs. 11, 12, 13, 14, 15, 16 and 17 various other uses of my invention are illustrated. Fig. 11 illustrates a convenient form of unit and fractional block construction adapted to form partition walls. In such case the unit blocks are thinner and shorter but the general construction may be that illustrated in Fig. 1. These partition units being of two piece type, permit both faces of the wall to be laid plumb and true, thus insuring an even coat of plaster on both faces of the wall or if desired, the wall may remain unplastered, presenting the same general appearance on both sides.

Figs. 12 and 13 illustrate alternate courses of blocks adapted to form columns or chimney structures. When used as chimney structures the fire clay lining is laid within the recess formed by the side blocks, the grooves providing vertical air spaces between the structure and the lining.

Figs. 14 and 15 illustrate columnar structures which are adapted to be filled with cement and reinforced in any suitable manner as by steel rods (not shown). It will be particularly noted that in Fig. 15 the inwardly extending bonding members are so arranged as to form dove tails by which the members of the blocks forming the column will be securely bound together so that the resulting structure will be practically integral.

Figs. 16 and 17 illustrate wall structures for bay windows in which fractional blocks of the unit shown in Fig. 1 are used, the principal structure comprising the block 11 heretofore described modified only by the provision of the abutting beveled walls 25. In this construction however, special corner blocks 26 and 27 are employed which require different molds from that above described for producing the unit and fractional blocks.

It will be obvious that where the unit system is used in any of the many forms described and illustrated a perfectly ventilated vaulted or hollow wall will be produced in which the vertical air spaces are continuous and uninterrupted to the full height of the wall and the horizontal air conduits which connect with the vertical air spaces are staggered, thus assuring a cross circulation running diagonally through the entire wall. Any movement of air therein will affect the entire vaulting system. Furthermore by reason of the ventilating of the vertical and horizontal joints in the manner above described, no opportunity is offered for moisture to penetrate through the wall.

On account of the peculiar design of the unit the objectionable features of usual vertical joints are eliminated. If moisture should find its way through the vertical joint it will encounter the current of air which passes through the vertical groove in the bonding member and will be evaporated. In the case of moisture finding its way on the horizontal joint, passing along the top of the bond member, it encounters the cross groove where again it comes in contact with a free current of air and is acted upon as in the case of the vertical joint; thus I have obtained my object of preventing dampness from reaching any portion of the interior surface of the wall. Any small opening at the bottom of the wall in any location will induce a movement of the air in these spaces which will create free circulation. In case it is desired to construct a solid wall either of plain or reinforced concrete, my unit construction permits an inexpensive simple and economic construction, eliminating the use of forms, reducing the number of employees, increasing the speed of construction and eliminating expensive equipment. The walls are laid up in the same manner as for a hollow or vaulted wall, the reinforcement being inserted in the vertical air spaces and horizontal reinforcements laid if desired in the cross grooves of the bonding member. As the walls are being erected and the reinforcements placed the air spaces are filled with a mixture of concrete suitable for the conditions, thus making a solid wall properly bonded and reinforced.

In case free standing piers or columns are desired, special units such as those illustrated in Figs. 14 and 15 may be used. These piers or columns may be either square or circular in form and may be reinforced and filled with concrete or permitted to remain hollow. The inwardly projecting members of the blocks desirably are arranged to present the interior dove-tail which will be engaged by the concrete filling in such a manner as to form in effect an integral column.

The pilaster units also may be used with concrete filling; in either case the blocks which comprise fractional parts of the principal unit are bonded into the adjoining wall thus forming a part of the same.

Units for wooden or roll shaped windows, doors, jambs, etc., are likewise embraced in my construction as above described all comprising the use of principal units or fractions thereof but merely requiring the use of a different filler block in molding the same. The gable units which likewise are comprised in my construction are of the principal unit type and made to conform to the roof pitch by the use of filler blocks and provided with cored apertures allowing the use of wall plate bolts as in usual constructions.

The lintels or caps for windows and doors also are made up of a series of blocks which are fractions of the principal unit, formed by placing the filler block in the portion of the mold which normally forms the bonding member.

It will be observed that in the entire system of unit construction the bonding and general arrangement are in strict accordance with the best engineering practice and allow a wide range for general commercial use. My system does not necessitate a large and expensively equipped plant for manufacturing but instead all units may, at the option of the builder or manufacturer, be made at the site of the building and readily laid in place by inexperienced labor since once the wall or pier is started the following courses may be made by merely positioning the blocks so as to break joints in alternate courses.

It will be understood that the particular form of unit block disclosed herein is illustrative but not restrictive and that various other forms of block may be utilized in the system of construction described herein, that whereas I have described the system as applied to building and wall construction it is nevertheless adapted for use in the formation of various other structures within the meaning and scope of the following claims.

Having thus described my invention what I claim as new and desire to secure by Letters Patent is:

1. A hollow wall composed of inner and outer courses of complementary building blocks, having facing members and superimposed bonding members, each bonding member being provided at its end with a vertical and a transverse groove, the vertical grooves of said bonding members embracing the vertical joints between the abutting ends of the complementary blocks in the courses, and the transverse grooves communicating with the air chambers between successive bonding members whereby a free circulation of air throughout the interior of the wall is permitted and evaporation of moisture passing through all the vertical joints is insured.

2. A hollow wall composed of inner and outer courses of complementary building blocks, having outer facing members and superimposed, laterally extending bonding members, each bonding member being provided at its side with a ventilating groove positioned to cross the joint between adjacent courses and at its end with a vertical and a transverse groove, the vertical grooves of said bonding members embracing the vertical joint between the abutting ends of the complementary blocks in the courses and the transverse grooves communicating with the air chambers between successive bonding members, whereby a free circulation of air throughout the wall is permitted and evaporation of moisture passing through all joints is insured.

3. A hollow wall construction composed of inner and outer courses of complementary building blocks, comprising principal unit blocks and blocks which are fractional parts of the unit block, said principal unit blocks and fractional blocks being each provided with a facing member and with a bonding member, the bonding members being superimposed in the wall structure and spaced apart to provide vertical air chambers, the end of each bonding member being provided with a vertical ventilating groove embracing the joint between the abutting complementary blocks of the same course, and with a transverse ventilating groove communicating with said vertical ventilating groove and with the adjacent vertical air chambers whereby a free circulation of air is established within the wall and across the vertical joints of each course which will insure evaporation of moisture passing through said vertical joints.

4. A hollow wall construction composed of inner and outer courses of complementary building blocks, each having an outer facing member and a laterally extending bonding member, said bonding members being superimposed and provided at their ends with vertical grooves embracing the abutting joints between adjacent courses and transverse grooves intersecting said vertical grooves, said vertical and transverse grooves being of such size as to minimize the area of contact between the outer and inner courses of the building blocks, by reason of which construction evaporation of moisture passing through the joints will be insured and the conduction of varying temperatures through the wall will be minimized.

5. A principal unit building block for wall construction, comprising a facing member and a bonding member extending laterally from the rear of said facing member, said bonding member having at its end intersecting vertical and horizontal ventilating grooves.

6. A principal unit building block for wall construction comprising a facing member and a bonding member extending laterally from the rear of said facing member, said bonding member having ventilating grooves extending across its upper and lower sides, adapted when the blocks are superimposed to traverse the joint between blocks of different courses, and intersecting vertical and horizontal ventilating grooves extending across its end.

In testimony whereof I have signed my name to this specification.

THOMAS C. TYSON.